United States Patent [19]

Rigsby

[11] Patent Number: 5,307,589
[45] Date of Patent: * May 3, 1994

[54] EBB AND FLOOD IRRIGATION SYSTEM

[75] Inventor: Robert W. Rigsby, North Fort Myers, Fla.

[73] Assignee: Pursley/Rigsby, Inc., Bradenton, Fla.

[*] Notice: The portion of the term of this patent subsequent to May 19, 2009 has been disclaimed.

[21] Appl. No.: 892,240

[22] Filed: Jun. 2, 1992

[51] Int. Cl.$^5$ ............................................. A01G 31/00
[52] U.S. Cl. ............................................ 47/59; 47/62
[58] Field of Search ............................ 47/62, 59, 79

[56] References Cited

U.S. PATENT DOCUMENTS

| | | |
|---|---|---|
| 3,053,011 | 9/1962 | Silverman . |
| 3,159,413 | 12/1964 | Silverman . |
| 3,552,058 | 1/1971 | Fici ........................... 47/79 |
| 3,660,933 | 5/1972 | Wong, Jr. .................. 47/62 |
| 3,903,644 | 9/1975 | Swift et al. ................ 47/79 |
| 4,045,909 | 9/1977 | Moss ......................... 47/62 |
| 4,334,386 | 6/1982 | Burcombe et al. ........ 47/62 |
| 5,007,135 | 4/1991 | Rigsby . |
| 5,113,618 | 5/1992 | Rigsby ....................... 47/72 |

FOREIGN PATENT DOCUMENTS 2455219 5/1976 Fed. Rep. of Germany .......... 47/62

Primary Examiner—Ramon S. Britts
Assistant Examiner—Joanne C. Downs
Attorney, Agent, or Firm—Brady, O'Boyle & Gates

[57] ABSTRACT

An ebb and flow irrigation system wherein a plurality of plant growing receptacles are placed in a plurality of large protective containers positioned in the ground. The containers are connected to a pipe system including inlet and outlet valves communicating with a holding pond. By this construction and arrangement, irrigating water is supplied to the containers to irrigate the plant growing receptacles placed therein, and after a period of time, the water is drained from the containers and directed to the holding pond. The containers thus function as ebb and flood containers, whereby plants and trees can be commercially grown without wasting water and polluting streams, rivers and adjoining soils by run-off leach.

11 Claims, 4 Drawing Sheets

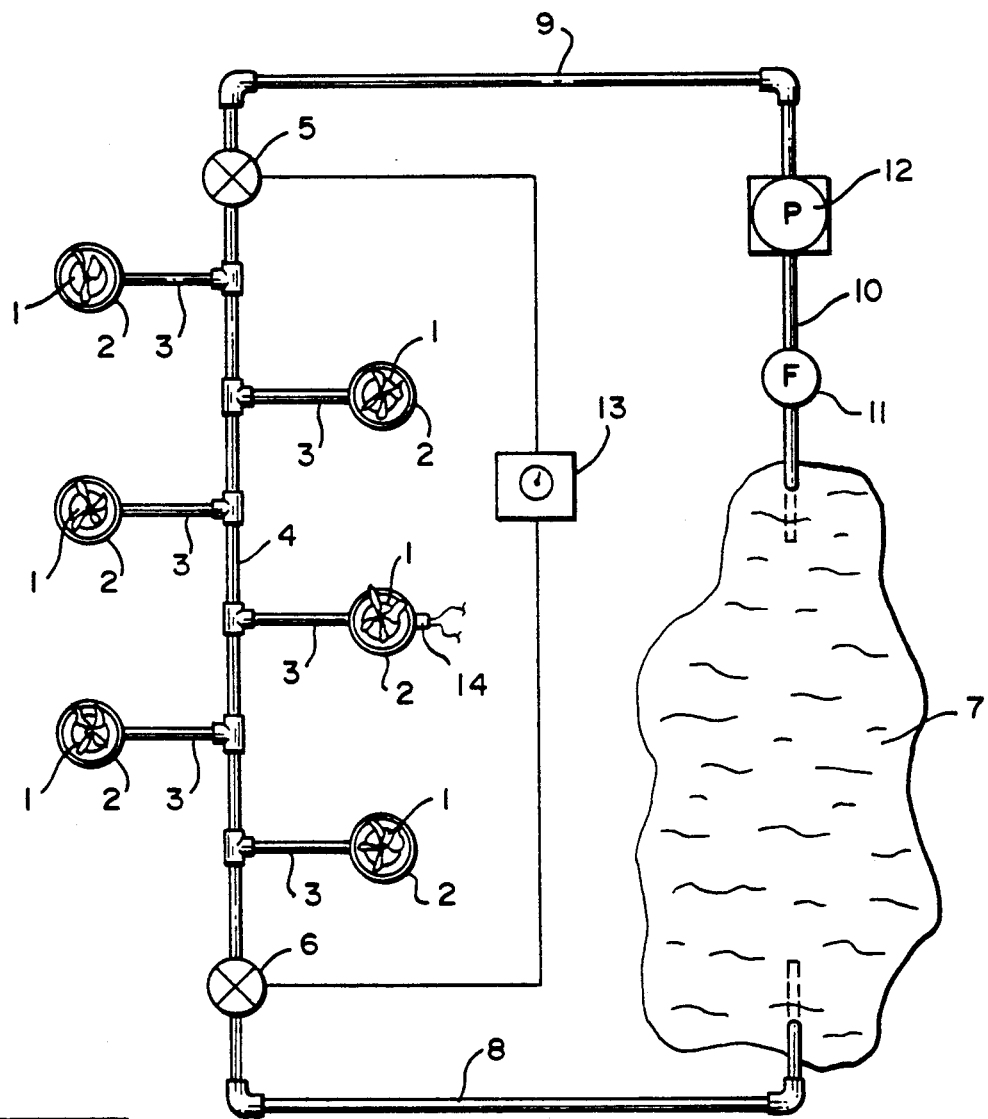
FIG_1
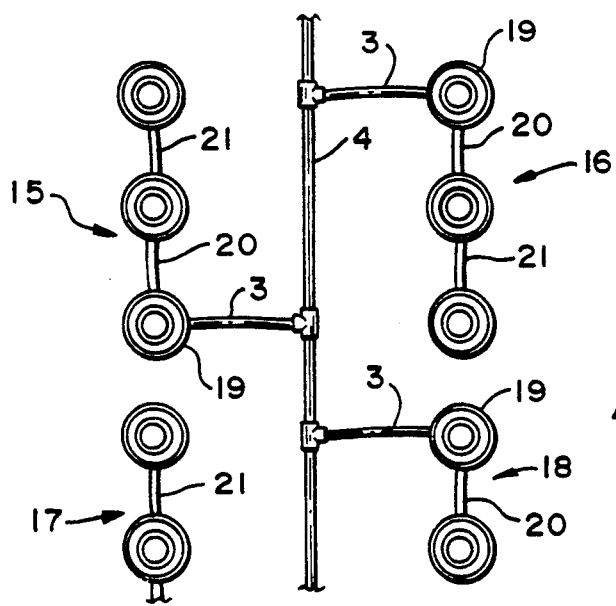
FIG_2

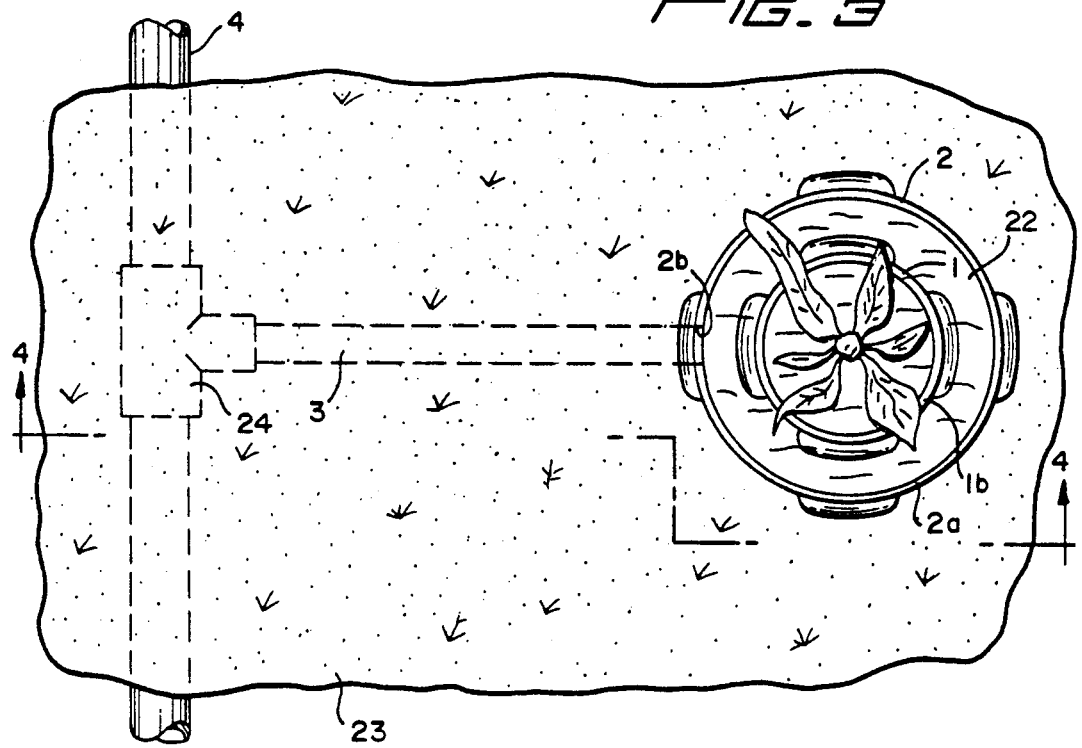
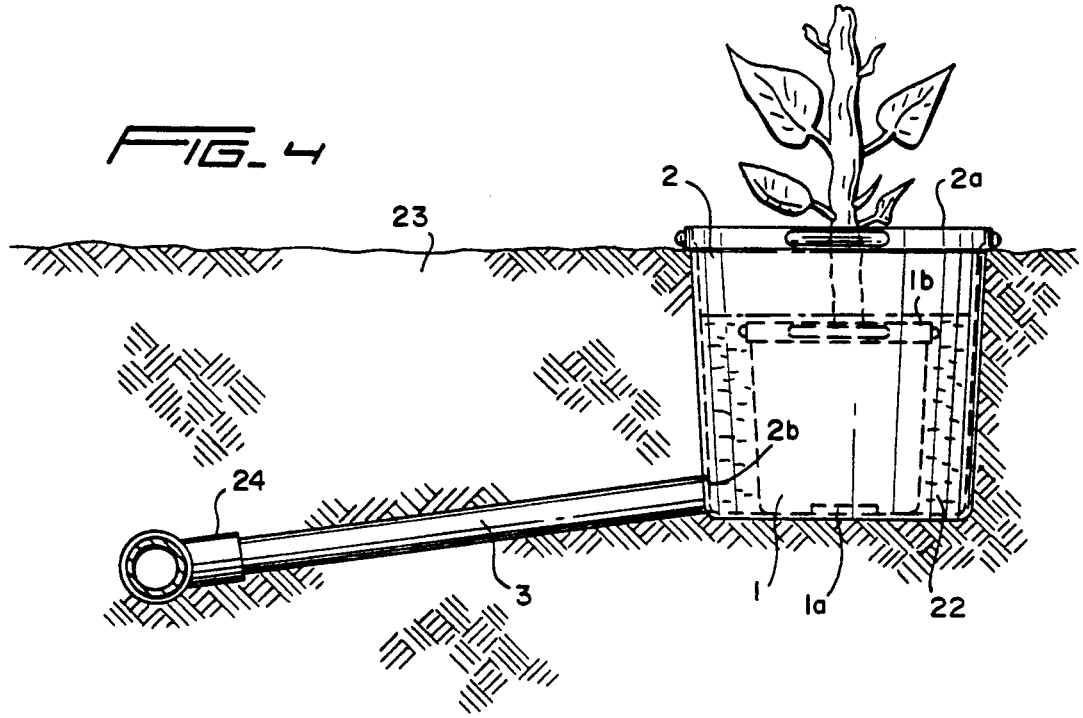

EBB AND FLOOD IRRIGATION SYSTEM

BACKGROUND OF THE INVENTION

In his continuing research and experimentation to devise an environmentally friendly irrigation system, applicant has extended the concepts of his plant growing receptacles disclosed in his U.S. Pat. No. 5,007,135 and pending application Ser. No. 07/653,673, filed Feb. 11, 1991; and his plant growing receptacle placed in a large protective container as disclosed in his pending application Ser. No. 07/699,654, filed May 14, 1991, to provide an irrigation system whereby there will be no ground water pollution to the surrounding environment from either the plant growing receptacles, large containers or irrigation system.

SUMMARY OF THE INVENTION

The irrigation system of the present invention comprises, essentially, a plurality of plant growing receptacles placed within a plurality of large protective containers positioned in the ground. The containers are connected to a pipe system including inlet and outlet valves, a pump and filter communicating with a holding pond. By this construction and arrangement, water and nutrient are supplied to the containers to irrigate the plant growing receptacles placed therein. After a period of time, the water is drained from the containers and directed to the holding pond. The containers thus function as ebb and flood containers whereby plants and trees can be commercially grown without wasting water and polluting streams, rivers, and adjoining soils by run-off leach.

BRIEF DESCRIPTION OF THE DRAWINGS

FIG. 1 is a diagrammatic view of the irrigation system of the present invention illustrating one embodiment of connecting the pipe system to the ebb and flood containers;

FIG. 2 is a diagrammatic view of another embodiment of a pipe system connected to the ebb and flood containers;

FIG. 3 is an enlarged fragmentary top plan view of one of the containers shown in FIG. 1, positioned in the ground and flooded to a level above the upper edge of a plant receptacle;

FIG. 4 is a view taken along line 4—4 of FIG. 3;

DESCRIPTION OF THE PREFERRED EMBODIMENTS

Figure 5:
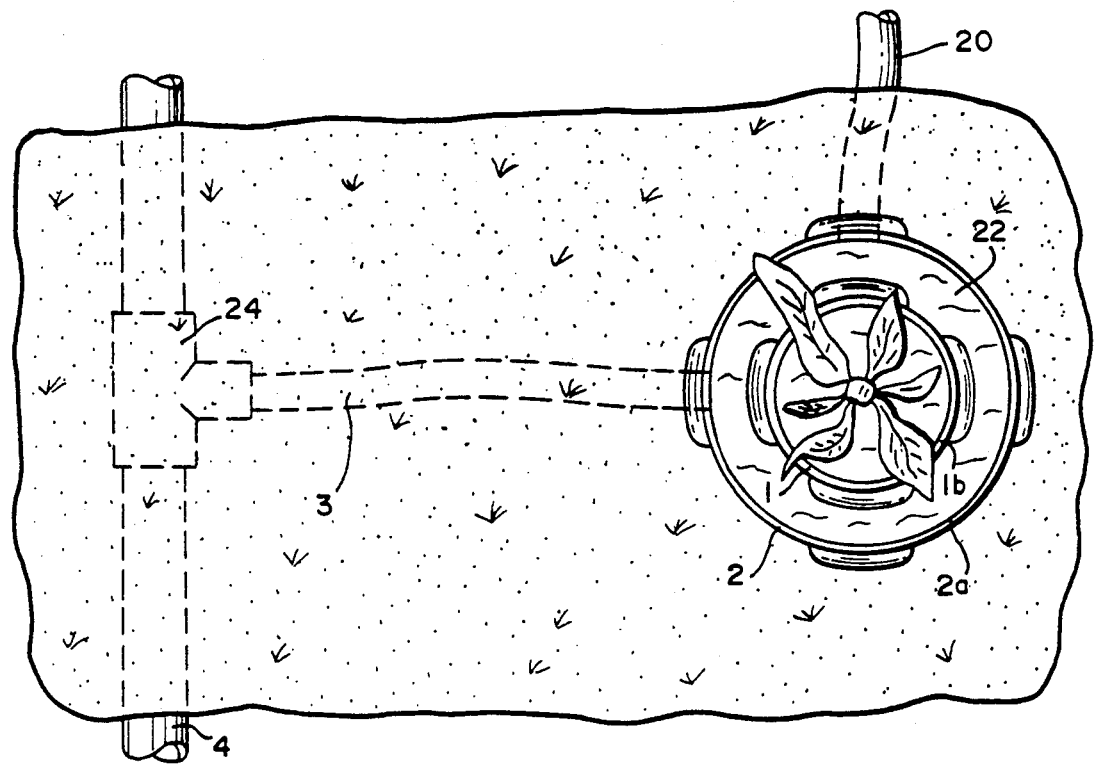
FIG. 5 is an enlarged fragmentary top plan view of one of the containers shown in FIG. 2, positioned in the ground.

Referring to the drawings and more particularly FIG. 1, the ebb and flood irrigation system of the present invention comprises a plurality of plant growing receptacles 1 placed within a plurality of large protective containers 2, each having a pipe 3 connected thereto communicating with a manifold pipe line 4. One end of pipe line 4 is provided with an inlet valve 5 while the other end of the pipe line 4 is provided with an exhaust or drain valve 6. The exhaust valve 6 communicates with one end of a holding pond or reservoir 7 through pipe 8, and inlet valve 5 communicates with the other end of the reservoir through pipes 9 and 10. A filter 11 and pump 12 are installed in the pipe line 10, and a timer 13 and moisture sensor 14 are operatively connected to the valves 5 and 6, to thereby control the ebb and flood of water to the container 1, to be described more fully hereinafter.

While FIG. 1 illustrates each of the containers 1 being individually connected to the manifold pipe 4, FIG. 2 shows another embodiment wherein groups 15, 16, 17 and 18 are provided wherein one container 19 in each group is connected to the manifold pipe 4 by branch pipe 3, the remaining containers in the group being sequentially connected by separate pipes 20, 21.

The details of the construction of the plant growing receptacles 1, protective containers 2 and pipes 3 and 4 are illustrated in FIGS. 3 and 4 wherein the plant receptacle 1 and large protective container 2 are similar to those disclosed in my aforementioned patent application Ser. No. 07/699,654; namely, the plant growing receptacle 1 having a drain opening 1a in the bottom wall is placed in the protective container 2 which has a greater height and width than the receptacle 1, whereby the top edge 2a of the container extends a substantial distance above the top edge 1b of the receptacle 1 and a space 22 is provided between the side walls of the container 2 and the receptacle 1, to thereby form a combined water reservoir and catch basin for collecting run-off rain and irrigation water, and fertilizer leach run-off from the receptacle 1. The container 2 is positioned in the ground 23, and the pipe 3 is connected at one end to an opening 2b provided in the side wall of the container 2 adjacent the bottom thereof and at the other end to the manifold pipe 4 through a tee fitting 24.

As will be seen in FIG. 4, the pipe 4 is buried in the ground at a position lower than the bottom wall of the container 2, to facilitate the draining or ebbing of the water from the container.

Figure 6:
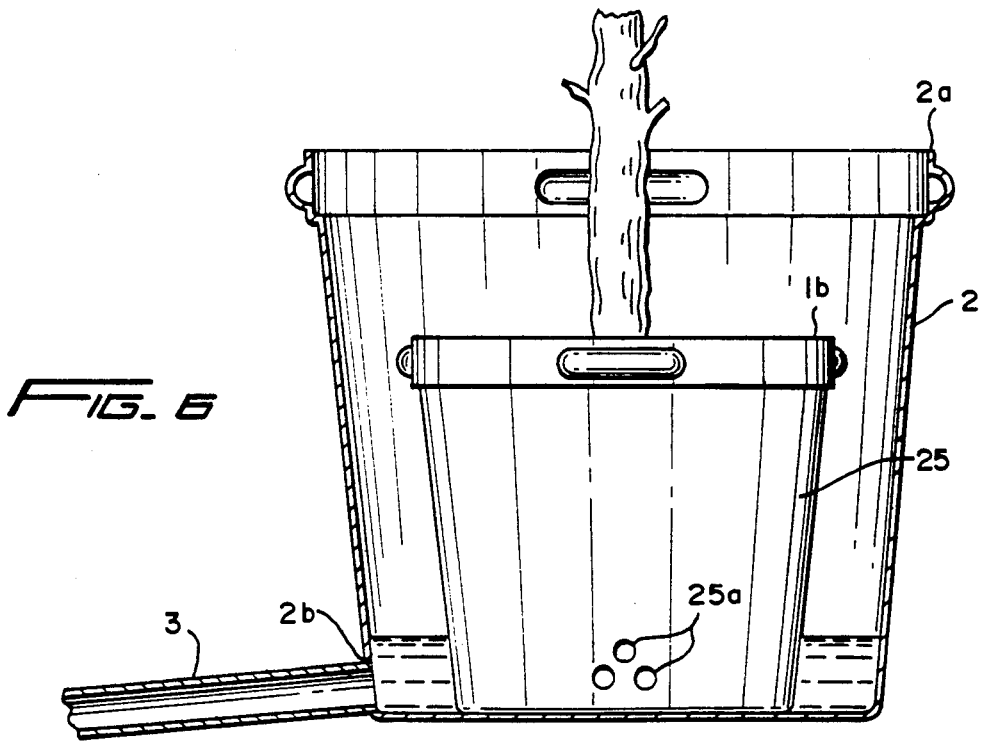
FIG. 6 is a fragmentary sectional side elevational view of a plant growing receptacle positioned within an ebb and flood container containing a volume of water.

While the plant growing receptacle 1 shown in FIG. 4 is a conventional receptacle having the drain opening 1a in the bottom wall of the receptacle, the receptacle 25 shown in FIG. 6 is of the type disclosed in my aforementioned U.S. Pat. No. 5,007,135 and pending application Ser. No. 07/653,673 wherein the receptacle has a closed bottom and a plurality of openings 25a provided in the side wall a distance above the closed bottom wall.

In the operation of the ebb and flood irrigation system of the present invention, water may be applied to the plant growing receptacle 1 in the container 2 in such a manner, as shown in FIG. 4, wherein the water level extends above the upper edge 1b of the receptacle 1, whereby the plant soil or dirt becomes completely saturated or flooded, or the water can be supplied to the container 2 in a manner shown in FIG. 6, wherein the plant soil is merely moistened. In each instance, after a period of time, the water is drained from the container.

To effect this ebb and flood of the containers 2, the system of FIG. 1 is provided wherein to supply irrigation water to the containers 2, the inlet valve 5 is opened, while the drain valve 6 is closed. Irrigation water is pumped from the holding pond 7 through the pipes 10, 9, 4, 3 and into the containers. When a desired amount of irrigation water is supplied to the containers 2, the inlet valve 5 is closed, and after a period of time sufficient to moisten the plant soil, or to remove excess chemicals, fertilizer and salt build-up from the soil, the drain valve 6 is opened allowing the flushing water to flow through pipe 8 back to the pond 7, where it can be filtered and reused in the irrigation system.

While the ebb and flood of irrigating water can be controlled by manually opening and closing the inlet valve 5 and outlet valve 6, it will be appreciated by those skilled in the art that a timer 13 can be employed for controlling the actuation of the valves, and a moisture sensor 14 mounted on the containers can equally be employed for controlling the valves.

By applying the irrigation water to the bottom of the container 2, rather than from above the container, no water is applied to the plant's foliage, to thereby prevent disease and discoloration of the foliage, and the washing off of any chemicals which might have been applied to the leaves. Furthermore, by having the water applied to the bottom of the container, evaporation caused by the wind is minimal.

By embedding the container 1 into the ground 23, the receptacle 2 will be prevented from tipping over due to the wind, and the plant will be subjected to a more even temperature and better protected from both the summer heat and the winter cold.

Figure 7:
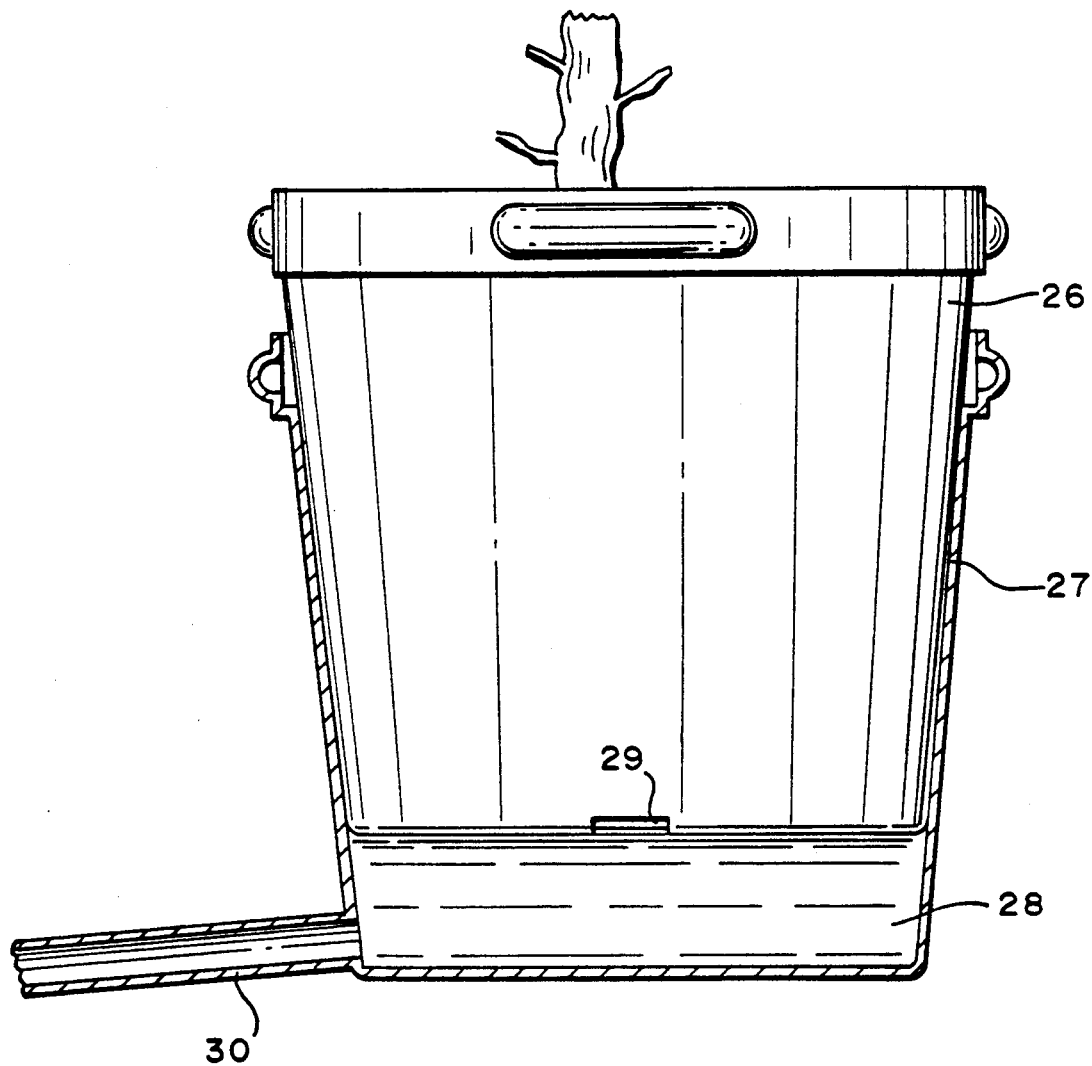
FIG. 7 is a side elevational view partly in section showing another embodiment of the irrigation system wherein the plant growing receptacle is nested within a protective container.

While the ebb and flood irrigation system illustrated in FIGS. 1 to 6 employs a protective container having a greater height and width than the plant growing receptacle, FIG. 7 illustrates another embodiment wherein the plant growing receptacle 26 is of the same size as the protective container 27, so that when the receptacle 26 is placed within the container 27, it becomes nested therein resulting in the tapered side walls engaging, to thereby provide a reservoir 28 for the irrigation water which can moisten the plant soil by capillary attraction through the aperture 29 in the bottom wall of the receptacle 26. As in the embodiment of FIGS. 1 to 6, a pipe 30 is connected to the side wall of the protective container 27 to facilitate the ebb and flood of irrigation water thereto.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An ebb and flood irrigation system comprising, at least one protective container having an open top and closed bottom wall, a plant growing receptacle placed in said container and supported on the closed bottom wall thereof, the container having a greater height and width than the receptacle, whereby the top edge of the container extends a substantial distance above the top edge of the receptacle and a water reservoir is provided by the space between the side walls of the receptacle and container, a drain opening in said receptacle, a pipe having one end connected to the side wall of the container adjacent the bottom wall thereof, means connected to the opposite end of said pipe for supplying irrigating water to the container and draining the water therefrom.

2. An ebb and flood irrigation system according to claim 1, wherein the drain opening is located in the bottom wall of the receptacle.

3. An ebb and flood irrigation system according to claim 1, wherein the drain opening is located in the side wall of the receptacle at a distance above the closed bottom wall thereof.

4. An ebb and flood irrigation system according to claim 1, wherein the means connected to the opposite end of the pipe for supplying irrigating water to the container and draining the water therefrom comprises a main pipe line having opposite ends communicating with a source of irrigating water, an inlet valve connected to the main pipe line between said water source and said pipe, and a drain valve connected to said main pipe line between said pipe and said water source, whereby when the drain valve is closed and the inlet valve is open, irrigating water flows from the source through the main pipe line and pipe into the container to selectively moisten the plant soil in the receptacle or to flood the container wherein the water level extends above the upper edge of the receptacle, and when the inlet valve is closed and the drain valve is open the irrigating water flows from the container through the pipe, main pipe line back into the source.

5. An ebb and flood irrigation system according to claim 1, wherein the container is positioned in the ground.

6. An ebb and flood irrigation system according to claim 4, wherein the container, pipe and pipe line are positioned in the ground, the pipe and pipe line being at a lower position than the bottom wall of the container, to facilitate the draining of the water from the container.

7. An ebb and flood irrigation system according to claim 4, wherein the source of irrigating water comprises a holding pond.

8. An ebb and flood irrigation system according to claim 4, wherein a plurality of containers are connected to the main pipe line wherein the main pipe line provides a manifold for supplying irrigating water to and draining water from each of the containers.

9. An ebb and flood irrigation system according to claim 4, wherein groups of containers are provided, said pipe being connected to one of the containers in each group, and separate pipes sequentially connecting the remaining containers in said group.

10. An ebb and flood irrigation system according to claim 4, wherein a moisture sensor is mounted on the container and operatively connected to the inlet and outlet valves.

11. An ebb and flood irrigation system according to claim 4, wherein a timer is operatively connected to the inlet and drain valves.

* * * * *